United States Patent
Liu et al.

(10) Patent No.: US 8,411,574 B2
(45) Date of Patent: *Apr. 2, 2013

(54) STARVATION FREE FLOW CONTROL IN A SHARED MEMORY SWITCHING DEVICE

(75) Inventors: Yao-Ching Liu, Cupertino, CA (US); William Dai, San Jose, CA (US); Jason Chao, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 89 days.

This patent is subject to a terminal disclaimer.

(21) Appl. No.: 11/512,259

(22) Filed: Aug. 30, 2006

(65) Prior Publication Data

US 2006/0291458 A1 Dec. 28, 2006

Related U.S. Application Data

(63) Continuation of application No. 09/650,260, filed on Aug. 29, 2000, now Pat. No. 7,120,117.

(60) Provisional application No. 60/123,091, filed on Mar. 5, 1999.

(51) Int. Cl.
*H04L 12/26* (2006.01)
*H04L 12/54* (2006.01)

(52) U.S. Cl. .................. 370/236; 370/230; 370/429

(58) Field of Classification Search .................. 370/230, 370/230.1, 231, 232, 235, 236, 389, 392, 370/398, 422, 428, 429

See application file for complete search history.

(56) References Cited

U.S. PATENT DOCUMENTS 5,278,789 A 1/1994 Inoue et al.

(Continued)

FOREIGN PATENT DOCUMENTS

EP 0312917 A2 4/1989

(Continued)

OTHER PUBLICATIONS

"A High-Speed CMOS Circuit for 1.2-Gb/s 16 ×16 ATM Switching," Alain Chemarin et al. 8107 IEEE Journal of Solid-State Circuits 27(Jul. 1992), No. 7, New York, US, pp. 1116-1120.

(Continued)

*Primary Examiner* — Hassan Phillips
*Assistant Examiner* — Saba Tsegaye (57) ABSTRACT

A shared memory packet switching device includes: a shared memory providing a shared memory space; an input logic unit associated with at least one receive port, and being operative to determine whether the associated receive port is saturated by determining whether a number of packets received via the associated receive port and currently stored in the shared memory exceeds a drop threshold value; a packet routing control unit operative to determine a destination one of the transmit ports for each of the received data packets; and an output logic unit associated with at least one of the transmit ports, the output logic unit being communicatively coupled with the packet routing control unit, and being operative to determine whether the associated transmit port is congested by determining whether a number of packets currently stored in the shared memory that are to be transmitted via the associated transit port exceeds a congestion threshold value, and also being operative to generate an associated output full signal indicative of whether the associated transmit port is congested. The input logic unit is responsive at least in part to each of the output full signals, and further operative to cause a selected packet received via the associated receive port to be dropped if the associated receive port is currently saturated and the output full signals indicate that a destination transmit port associated with the selected packet is currently congested.

15 Claims, 7 Drawing Sheets

U.S. PATENT DOCUMENTS

| | | | |
|---|---|---|---|
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,541,912 A | 7/1996 | Choudhury et al. | |
| 5,555,398 A | 9/1996 | Raman | |
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,726,987 A | 3/1998 | Uriu et al. | |
| 5,742,613 A | 4/1998 | MacDonald | |
| 5,748,631 A | 5/1998 | Bergantino et al. | |
| 5,781,549 A | 7/1998 | Dai | |
| 5,787,071 A | 7/1998 | Basso et al. | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,838,677 A * | 11/1998 | Kozaki et al. | 370/389 |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,901,140 A | 5/1999 | Van As et al. | |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A * | 11/1999 | Creedon et al. | 709/215 |
| 6,009,078 A * | 12/1999 | Sato | 370/232 |
| 6,011,795 A | 1/2000 | Varghese et al. | |
| 6,041,053 A | 3/2000 | Douceur et al. | |
| 6,061,351 A | 5/2000 | Erimli et al. | |
| 6,097,698 A | 8/2000 | Yang et al. | |
| 6,115,356 A * | 9/2000 | Kalkunte et al. | 370/229 |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,219,728 B1 | 4/2001 | Yin | |
| 6,456,590 B1 * | 9/2002 | Ren et al. | 370/229 |
| 6,515,963 B1 | 2/2003 | Bechtolsheim et al. | |
| 6,532,234 B1 * | 3/2003 | Yoshikawa et al. | 370/395.4 |
| 6,606,300 B1 | 8/2003 | Blanc et al. | |
| 6,628,613 B1 * | 9/2003 | Joung et al. | 370/230 |
| 6,721,273 B1 * | 4/2004 | Lyon | 370/235 |
| 7,016,301 B1 * | 3/2006 | Moore | 370/235 |
| 7,061,861 B1 * | 6/2006 | Mekkittikul et al. | 370/230 |
| 2002/0089933 A1 | 7/2002 | Giroux et al. | |
| 2006/0259572 A1 * | 11/2006 | Brown | 709/213 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 9/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 1/1999 |

OTHER PUBLICATIONS

"Local Area Network Switch Frame Lookup Technique for Increased Speed and Flexibility," 700 IBM Technical Disclosure Bulletin 38(Jul. 1995), No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8 ×8 ATM Switch Chip Set with Shared Multibuffer Architecture," Harufusa Kondoh et al., 8107 IEEE Journal of Solid-State Circuits 28(Jul. 1993), No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

STARVATION FREE FLOW CONTROL IN A SHARED MEMORY SWITCHING DEVICE

REFERENCE TO RELATED APPLICATIONS

This application is a Continuation of U.S. application Ser. No. 09/650,260, filed Aug. 29, 2000, now U.S. Pat. No. 7,120,117, issued Oct. 10, 2006, which claims priority from U.S. Provisional Application No. 60/123,091, filed Mar. 5, 1999. The disclosure of the prior application(s) is hereby incorporated by reference herein in its entirety.

BACKGROUND OF THE INVENTION

1. Field of the Invention

The present invention relates generally to flow control methodologies in communications networks, and more specifically to a shared memory packet switching device providing starvation free flow control functions.

2. Description of the Prior Art

Flow control relates to point to point traffic between a sending node and a receiving node in a network. In general, flow control methodologies provide for assuring that a fast sending node does not transfer data faster than the receiver can absorb it. Flow control typically involves some direct feedback from the receiving node to the sending node to tell the sending node how things are doing at the receiving end. One type of flow control method provides for a receiving node to assert backpressure on a sending node that is sending data too fast for the receiving node to handle. Typically, upon a determination by the receiving node that the sending node is sending data too fast, the receiving node will transmit a pause message to the sending node to instruct the sending node to pause in sending data to the receiving node. Sometimes, the sending node does not respond to the pause message and continues to send data to the receiving node which can lead to problems further discussed below. Another type of flow control method is packet dropping wherein packets, received from a sending node that cannot be processed by the receiving node, are simply dropped.

Figure 1:
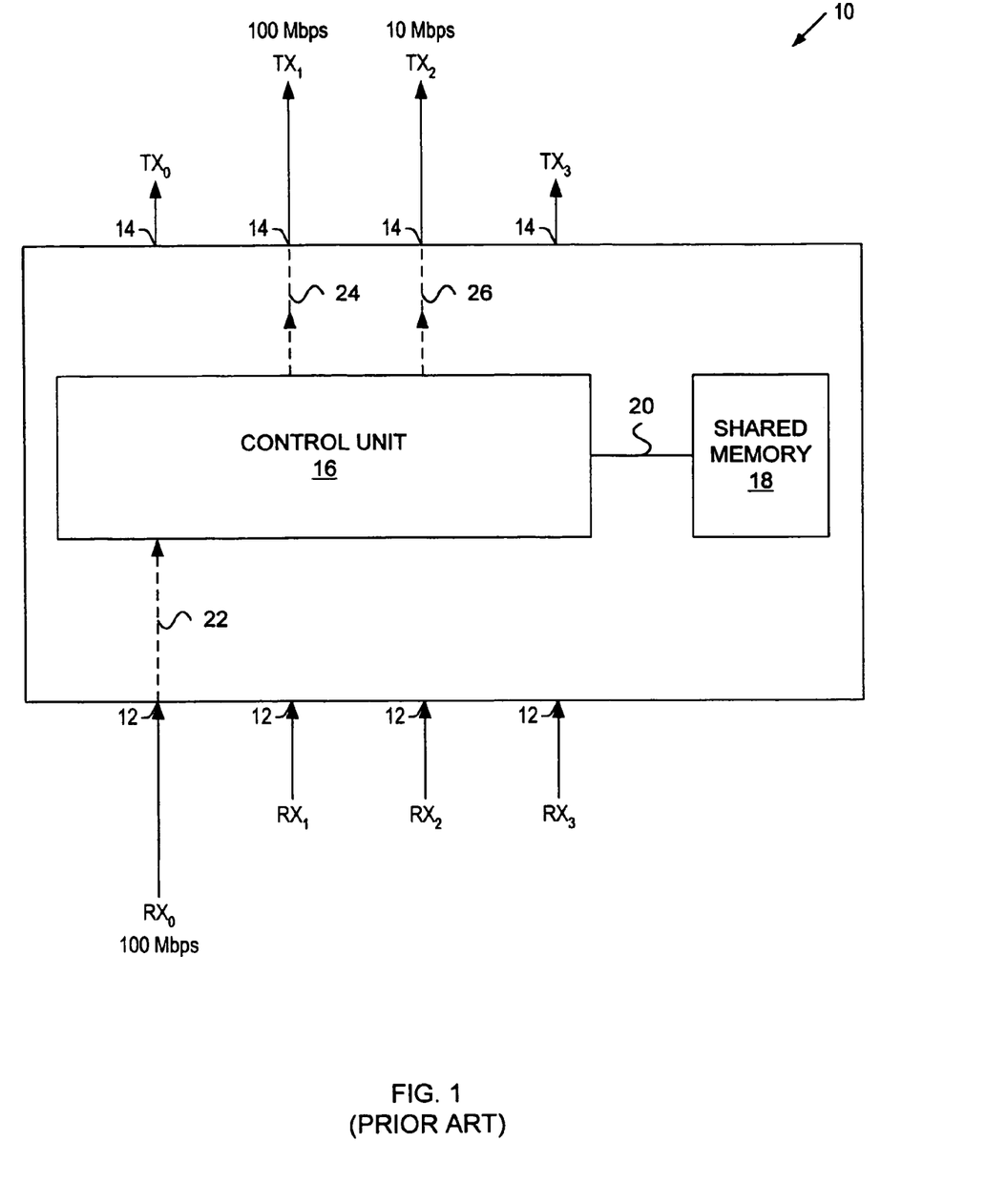
FIG. 1 is a schematic circuit block diagram illustrating a prior art shared memory packet switching device operating in accordance with conventional networking management flow control methods including a conventional backpressure assertion process and a conventional packet dropping process.

FIG. 1 shows a schematic circuit block diagram illustrating a prior art shared memory packet switching device at 10 operating in accordance with conventional networking management flow control methods including a conventional backpressure assertion process, and/or a conventional packet dropping process. The device 10 includes: a plurality of N receive ports 12 designated $RX_0$, $RX_1$, $RX_2$, ... $RX_{n-1}$; and a plurality of N transmit ports 14 designated $TX_0$, $TX_1$, $TX_2$, ... $TX_{n-1}$. Typically, each of the receive ports 12 and associated ones at the transmit ports 14 are formed by associated bi-directional ports that are communicatively coupled with associated ones of a plurality of network nodes (not shown) via associated network links (not shown).

The device 10 also includes: a switch control unit 16 communicatively coupled with each of the receive ports and with each of the transmit ports; and a shared memory unit 18 communicatively coupled with the control unit 16 as shown by a line 20. The control unit 16 typically provides packet routing functions for determining destination ports for each data packet received at the received ports, and also provides for temporarily storing and accessing the received data packets to and from the shared memory unit 18. The control unit 16 also typically provides destination port arbitration, and flow control processes such as packet dropping and assertion of backpressure.

Flow control problems may arise at the switching device 10 during operation in a network of a sending note (not shown) sends data packets to the switching device at a rate that overloads the switching device. To illustrate an exemplary network flow control problem, assume that receive port $RX_0$ has a bandwidth of 100 Mbps, transmit port $TX_1$ has a bandwidth 100 Mbps, and transmit port $TX_2$ has a bandwidth of 10 Mbps. Consider also that half of the data packets being received at receive port $RX_0$ are to be transmitted via port $TX_1$ as indicated by a line 24, and the other half of the packets being received at port $RX_0$ are to be transmitted via port $TX_2$ as indicated by a line 26. In this case, the shared memory unit 18 will be filled with a large number of packets to be transmitted via port $TX_2$ because the bandwidth of the receive port $RX_0$ is much greater than the bandwidth of the transmit port $TX_2$. Therefore, port $TX_2$ is said to be congested. Because the memory space of the shared memory unit 18 is limited, a fairness problem arises if an excess amount of the memory space is used for storing packets received by a particular one of the receive ports 12 because the other receive ports 12 also require memory space of the shared memory unit for buffering received data packets. Therefore, the receive port $RX_0$ will ultimately reach a "full" or "saturated" state if a threshold number of packets received at port $RX_0$ are currently stored in the shared memory unit.

In accordance with one solution to this problem, the switching device 10 may assert backpressure on the source nodes (not shown) sending data packets to port $RX_0$ by sending a pause message via the associated transmit port $TX_0$ (which is communicatively coupled with the same network link as the receive port $RX_0$) to the sending nodes instructing the sending nodes to pause in sending data packets. However, the sending nodes may or may not recognize the pause message in which case an excess amount of data packets received at port $RX_0$ and destined for port $TX_2$ will soon fill the shared memory unit 18. Another solution to this problem provides for dropping all packets received at port $RX_0$ after port $RX_0$ reaches the full condition. However, by dropping all packets received at port $RX_0$, all of the traffic between port $RX_0$ and port $TX_1$ will be blocked. In this case, port $TX_1$ is said to be starved.

What is needed is a method and apparatus for providing starvation free flow control in a shared memory switching device.

SUMMARY OF THE INVENTION

It is an object of the present invention to provide a shared memory packet switching device that provides starvation free flow control functions wherein an uncongested transmit port of the device is not starved as a result of flow control functions initiated at a saturated receive port as a result of heavy traffic through the device between the saturated receive port and a plurality of transmit ports including the uncongested transmit port and other transmit ports some of which may be congested.

Briefly, a presently preferred embodiment of the present invention provides a shared memory packet switching device having a plurality of receive ports for receiving data packets, and a plurality of transmit ports for transmitting data packets, the device providing a process of controlling the flow of data through the device.

The packet switching device includes: a shared memory providing a shared memory space for temporary storage of data packets received via the receive ports; at least one input logic unit associated with at least one of the receive ports, and being operative to determine whether the associated receive port is saturated by determining whether a number of packets received via the associated receive port and currently stored in the shared memory exceeds a predetermined drop threshold value; a packet routing control unit communicatively coupled with the at least one input logic unit, and being operative to determine a destination one of the transmit ports for each of the received data packets; and at least one output logic unit associated with at least one of the transmit ports, the output logic unit being communicatively coupled with the packet routing control unit, and being operative to determine whether the associated transmit port is congested by determining whether a number of packets currently stored in the shared memory that are to be transmitted via the associated transit port exceeds a predetermined congestion threshold value, and also being operative to generate an associated output full signal indicative of whether the associated transmit port is congested. The input logic unit is responsive at least in part to each of the output full signals, and being further operative to cause a selected packet received via the associated receive port to be dropped if the associated receive port is currently saturated and the output full signals indicate that a destination transmit port associated with the selected packet is currently congested.

In accordance with one aspect of the present invention, the switching device further includes a memory control unit for accessing data packets stored in the shared memory, and being operative to generate a count enable signal, and to assert the enable signal while a predetermined threshold portion of the shared memory space is occupied by stored packet data. The input logic unit also includes: an input counter responsive to the enable signal, and operative to provide an associated input count value indicative of the number of packets that are currently stored in the shared memory and that have been received via the associated receive port during a period wherein the enable signal is asserted, the input counter being further operative to clear the associated input count value if the enable signal is de-asserted; a first comparator unit responsive to the input count value, and operative to generate an associated select drop signal, and to assert the associated select drop signal based on a comparison between the input count value and the drop threshold value; and a drop logic unit responsive to the associated select drop signal and at least in part to the output full signals, and operative to drop a selected data packet received via the associated receive port if the associated select drop signal is asserted and the output full signals indicate that the destination transmit port associated with the selected packet is currently congested.

The input logic unit further includes: a second comparator unit responsive to the input count value, and operative to generate an associated pause signal for indicating that backpressure is to be asserted at the associated receive port, and to assert the associated pause signal based on a comparison between the associated input count value and a predetermined backpressure threshold value. The output logic unit further includes a transmit port control unit responsive to the associated pause signal, and operative to assert back pressure on an associated network link that is communicatively coupled with the associated receive port. In one embodiment, the transmit port control unit is operative to assert backpressure by transmitting a pause message via the associated network link.

In accordance with another aspect of the present invention, the input logic unit is further responsive to a drop enable signal selectively enabled by a user of the switching device to indicate whether packets may be dropped by the switching device, the input logic unit only being operative to cause the selected packet to be dropped if the drop enable signal indicates that packet dropping is enabled.

In a first embodiment of the present invention, the drop threshold value is predefined to be greater than the backpressure threshold value, whereby the switching device is operative to assert backpressure at a particular receive port before dropping packets received via the particular receive port. In a second embodiment of the present invention, the drop threshold value is defined to be less than the backpressure threshold value, whereby the switching device is operative to drop packets received via the associated receive port in order to avert the necessity of asserting backpressure at the associated receive port.

An important advantage of the starvation free flow control process of the present invention is that an uncongested transmit port of the device is not starved as a result of flow control functions initiated at a saturated receive port as a result of heavy traffic through the device between the saturated receive port and a plurality of transmit ports including the uncongested transmit port and other transmit ports some of which may be congested.

The foregoing and other objects, features, and advantages of the present invention will be apparent from the following detailed description of the preferred embodiment, which makes reference to the several figures of the drawing.

DETAILED DESCRIPTION OF THE PREFERRED EMBODIMENTS

Figure 2:
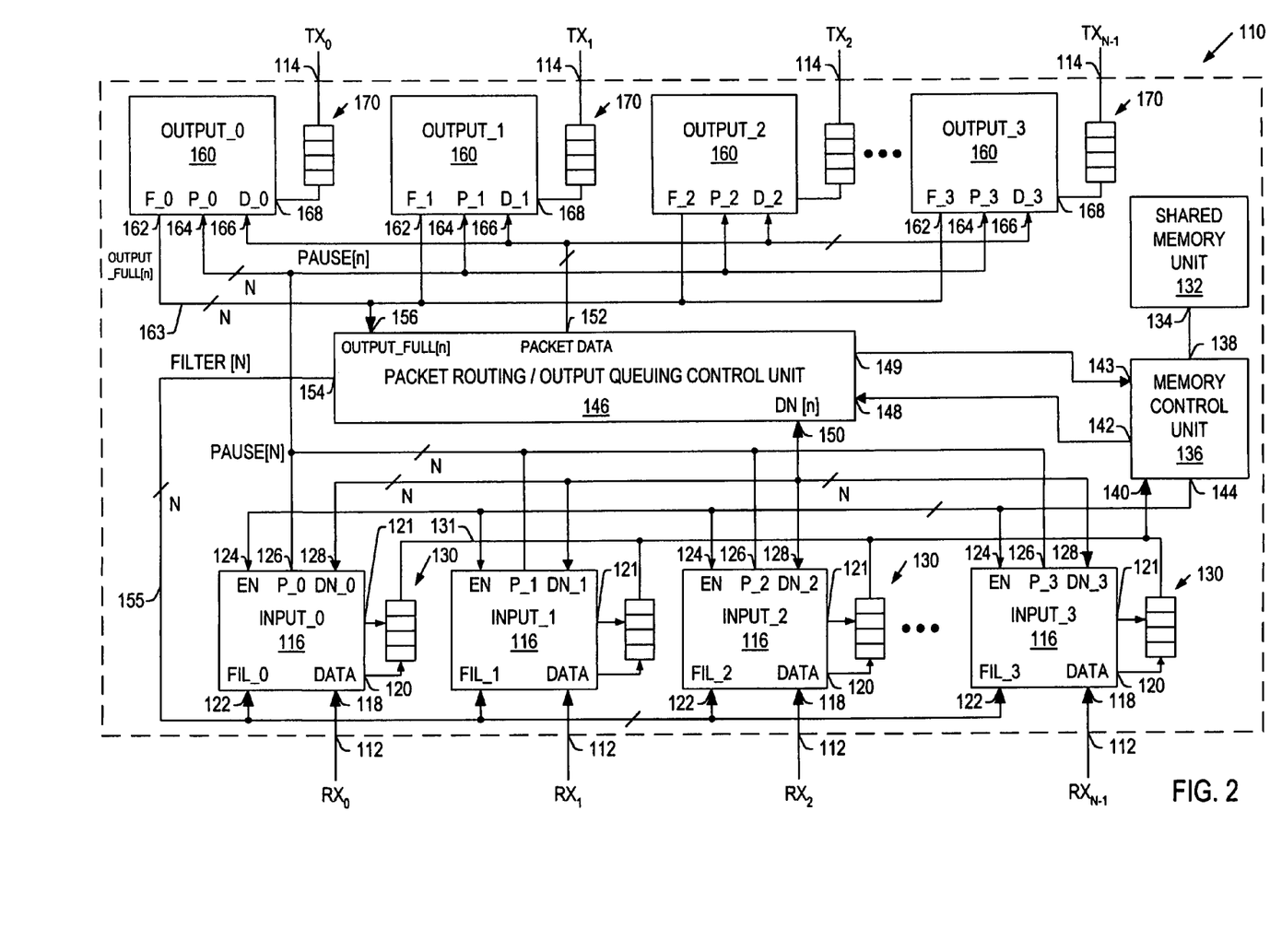
FIG. 2 is a schematic circuit block diagram illustrating a shared memory packet switching device in accordance with the present invention including a plurality of input logic units, a plurality of output logic units, and a packet routing/output queuing control unit, the device being operative to provide a starvation free flow control process in accordance with the present invention.

FIG. 2 shows a schematic circuit block diagram of a shared memory packet switching device at 110 in accordance with the present invention. In the described embodiment, the switching device 110 has an output queuing architecture. The device 110 includes: a plurality of N receive ports 112 designated $RX_0, RX_1, RX_2, \ldots RX_{n-1}$; and a plurality of N transmit ports 114 designated $TX_0, TX_1, TX_2, \ldots TX_{n-1}$. In one embodiment, each of the receive ports 112 and associated ones at the transmit ports 114 are formed by associated bidirectional ports that are communicatively coupled with associated ones of a plurality of network nodes via associated links (not shown). In the depicted embodiment, N=4.

The switching device 110 further includes a plurality of input logic units 116 designated INPUT_0, INPUT_1, INPUT_2, . . . INPUT_3 each being communicatively coupled with one of the receive ports 112 as further explained below. Each of the input logic units is responsive to data packets received at the associated receive port 112, and is operative to determine current data flow conditions at the associated receive port, and is also operative to initiate backpressure assertion functions and packet dropping functions in accordance with a starvation free flow control methodology of the present invention. As further explained below, a received packet is only dropped by an associated input logic unit if it is determined that the associated receive port is in a full or saturated state, and the destination transmit port 114 associated with the received packet is currently in a congested state.

Each of the input logic units 116 includes: a packet data input port 118 communicatively coupled with the associated receive port 112 for receiving incoming packet data from the associated network link; a data packet output port 120; a drop packet output port 121 for providing a DROP control signal as further explained below; a filter signal input port 122 for receiving an associated one of N filter signals designated FILTER[N] each indicating whether an associated one of the transmit ports 114 is currently congested as further explained below; an enable signal input port 124 for receiving an enable signal designated EN indicating whether a threshold portion of the shared memory space is occupied such that flow control functions need to be activated as further explained below; a pause signal input port 126 for providing an associated one of N pause signals designated PAUSE[N] for indicating that backpressure is to be asserted via the associated network link as further explained below; and a port 128 for receiving an associated one of N down-count signals designated DN[N] for indicating that a packet received at the associated receive port has been transmitted via one of the transmit ports 114 as further explained below, the port 128 also for providing destination address information associated with received data packets. The switching device 110 further includes: a plurality of N receive buffer queues 130 each being associated with one of the receive ports 112 and having an input communicatively coupled with the packet data output port 120 of the associated one of the input logic units 116, a drop signal input for receiving the DROP signal from port 121 of the associated input logic unit, and an output communicatively coupled with a data bus 131 as further explained below; a shared memory unit 132 for receiving packet data and having a port 134; and a memory control unit 136 having a port 138 communicatively coupled with port 134 of the shared memory unit, a packet data input port 140 communicatively coupled with each of the receive buffer queues 130 via the data bus 131 for receiving data packets from the receive queues, a data output port 142 for providing packet data read from the shared memory, and an enable signal output port 144 for providing the enable signal EN to the input port 124 of each of the input logic units. The memory control unit is operative to access data packets, including storing and retrieving data packets, in the shared memory unit 132. The memory control unit is also operative to determine whether the total amount of memory space occupied by packet data in the shared memory unit is greater than or equal to a memory occupancy threshold value, P. In one embodiment, the memory occupancy threshold value, P, is expressed as a percentage such as 50% of the shared memory space. In one embodiment, the control unit 136 asserts the EN signal when the amount of occupied shared memory space is greater than or equal to P. If a predetermined threshold portion of the total shared memory space is occupied by stored packet data, then it is assumed that flow control functions are required and the EN signal is asserted.

The switching device 110 further includes: a packet routing/output queuing control unit 146 having a data input port 148 for receiving packet data from port 142 of the memory control unit 136, a port 150 for receiving destination address values from the input logic units, and for providing the down-count signals DN[N] to the associated input logic units as further explained below, a packet data output port 152 for providing data packets for transmission via associated ones of the transmit ports 114, a filter signal output port 154 for providing the associated filter signals FILTER[N] to port 122 of each of the associated input logic units, and an output full signal input port 156 for receiving a plurality of N output full signals designated OUTPUT_FULL each for indicating whether an associated one of the transmit ports 114 is currently congested as further explained below. In operation, the control unit 146 is responsive to destination address values (e.g. MAC address values associated with the received data packets) received from the input logic units via its port 150, and operative to determine a destination one of the transmit ports for each received data packet. The output queuing control unit 146 also provides output arbitration functions. As further explained below, the control unit 146 further includes logical components used in the flow control functions of the switching device 110.

The switching device 110 further includes a plurality of output logic units 160 each being associated with one of the transmit ports 114 and being designated OUTPUT_0, OUTPUT_1, OUTPUT_2, . . . OUTPUT_3. Each of the output logic units 160 includes: an output full signal output port 162 for providing an associated one of N output full signals designated OUTPUT_FULL[N] to port 156 of the packet routing/output queuing control unit 146 via an N bit OUTPUT_FULL signal bus 163; a pause signal input port 164 communicatively coupled with the pause signal output ports 126 of an associated one of the input logic units 116 for receiving an associated one of the N pause signals designated PAUSE[N] for indicating that backpressure is to be asserted via the associated transmit port; a data input port 166 communicatively coupled with the packet data output port 152 of the packet routing/output queuing control unit 146 for receiving packet data; and a data output port 168.

The switching device 110 further includes a plurality of N transmit buffer queues 170 each having an input port communicatively coupled with the data output port 168 of the associated one of the output logic units 160, and an output port communicatively coupled with an associated one of the transmit ports 114 of the packet switching device 110. In one embodiment, each of the receive queues 130, and each of the transmit queues 170 is a first-in-first-out memory unit (FIFO).

Each of the output logic units 160 is operative to determine whether the associated transmit port 114 is currently in a state of congestion based on the number of data packets currently stored in the shared memory unit 132 that are destined to be transmitted via the associated transmit port as further described below. If the associated transmit port is determined to be congested, the output logic unit asserts the associated one of the OUTPUT_FULL[N] signals. The output queuing control unit 146 is responsive to the OUTPUT_FULL[N] signals and operative to assert associated ones of the FILTER[N] signals to indicate that associated packets may be dropped by associated ones of the input logic units 116 if the associated OUTPUT_FULL[N] signal is asserted and other conditions are satisfied as further explained below. Operation of the device 110 is further explained below.

Figure 3:
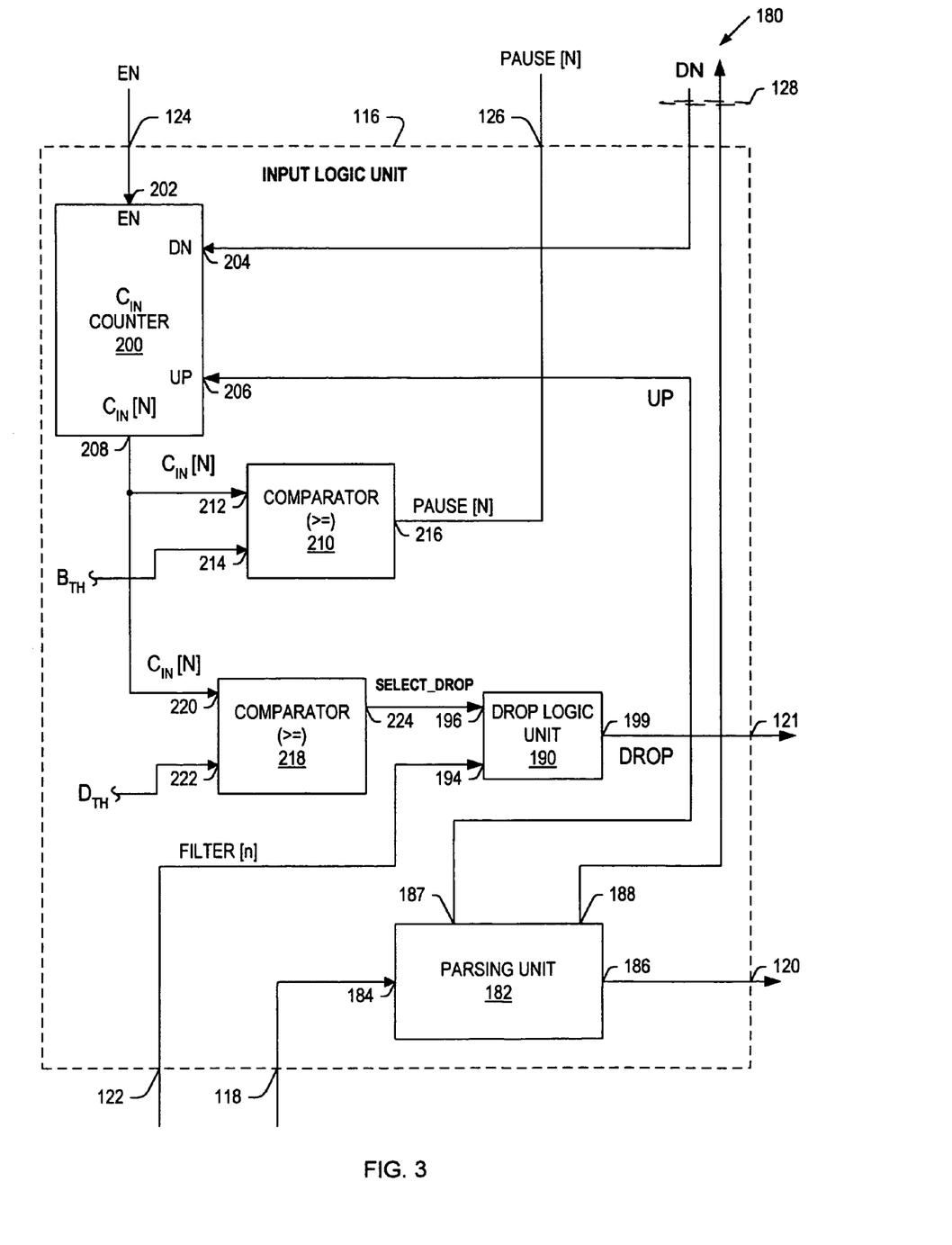
FIG. 3 is a schematic circuit block diagram illustrating details of one of the input logic units of the switching device of FIG. 1, the input logic unit for determining data flow conditions at an associated receive port of the switch.

FIG. 3 shows a schematic circuit block diagram illustrating details of one of the input logic units 116 (FIG. 2) at 180 in accordance with the present invention. In the depicted embodiment, the input logic unit 116 includes: a parsing unit 182 having an input port 184 for receiving packet data via the associated one of the receive ports 112 (FIG. 2), an output port 186 communicatively coupled with the associated one of the receive buffer queues 130 (FIG. 2) via port 120 of the input logic unit, a port 187 for providing an up count signal designated UP for indicating that a data packet has been received at the associated receive port, and a destination address output port 188 for providing the destination addresses (e.g. destination MAC addresses) of associated received packets; a drop logic unit 190 having a port 199 for providing the DROP signal to the associated one of the receive queues 130 (FIG. 2) via port 121 of the input logic unit, an input port 194 for receiving the associated one of the filter signals FILTER[N] via port 122 of the input logic unit, a port 196 for receiving a select drop signal designated SELECT_DROP as further explained below; an input counter 200 having an enable input port 202 for receiving the EN signal from the memory control unit 136 (FIG. 2) via port 124 of the input logic unit, a down-count signal input port 204 for receiving the associated one of the down-count signals DN[N] from the packet routing/output queuing control unit 146 (FIG. 2), an up-count signal input port 206 for receiving the up-count signal UP from port 187 of the parsing unit 182, and a count signal output port 208 for providing an associated input count value designated $C_{IN}[N]$ indicative of a number of packets that are currently stored in the shared memory and that have been received via the associated receive port during a period in which the EN signal is asserted; a pause comparator 210 having a first input port 212 for receiving the input count value $C_{IN}[N]$ from port 208 of the input counter, a second input port 214 for receiving a backpressure threshold value designated $B_{TH}$ as further explained below, and an output port 216 for providing the associated one of the pause signals PAUSE[N] to the output logic units 160 (FIG. 2) via port 126 of the input logic unit; and a drop threshold comparator 218 having a first input port 220 for receiving the input count value $C_{IN}[N]$, a second input port 222 for receiving a drop threshold value designated $D_{TH}$, and an output port 224 for providing the SELECT_DROP signal to port 196 of the drop logic unit 190.

As mentioned above, the enable signal EN is asserted by the memory controller 136 (FIG. 2) while the predetermined threshold portion P of the shared memory space is occupied by stored packet data. Also the down-count signal DN[N] is asserted by the packet routing/output queuing control unit 146 (FIG. 2) when a data packet originating at the associated receive port 112 (FIG. 2) is transmitted via the associated transmit port 114 (FIG. 2). The parsing unit 182 is operative to assert the up-count signal UP when a packet is received at the associated receive port 112 (FIG. 2). Therefore, the input counter 200 is operative to determine a number of packets that have been received at the associated receive port since the enable signal EN was asserted, and which are currently stored in the shared memory unit 132 (FIG. 2) because they have yet to be transmitted via one of the transmit ports. The input counter 200 is operative to clear the input count value when the EN signal is de-asserted.

The first comparator 210 is operative to assert the PAUSE [N] signal when the input count value $C_{IN}[N]$ is greater than or equal to the backpressure threshold value $B_{TH}$. The second comparator 218 is operative to assert the SELECT_DROP signal when the input count signal $C_{IN}[N]$ is greater than or equal to the drop threshold value $D_{TH}$. The drop logic unit 190 is operative to assert the DROP signal when the SELECT_ DROP signal and the associated FILTER[N] signal are both asserted. The associated receive queue 130 (FIG. 2) is responsive to the DROP signal, and operative to drop a received packet stored therein when the DROP signal is asserted.

In accordance with the flow control methodology of the present invention, a packet is only dropped if: (1) the associated receive port is in a "full" or "saturated" state as indicated by the SELECT_DROP signal being asserted when $C_{IN}[N] \geq D_{TH}$; and (2) the transmit port 114 (FIG. 2) to which the packet is destined is in a congested state as indicated by the associated one of the FILTER[N] signals being asserted as further explained below. Depending on the selected values for $D_{TH}$ and $B_{TH}$, backpressure may be asserted for a receive port, either before or after packets are dropped at the associated receive port as further explained below.

Figure 4:
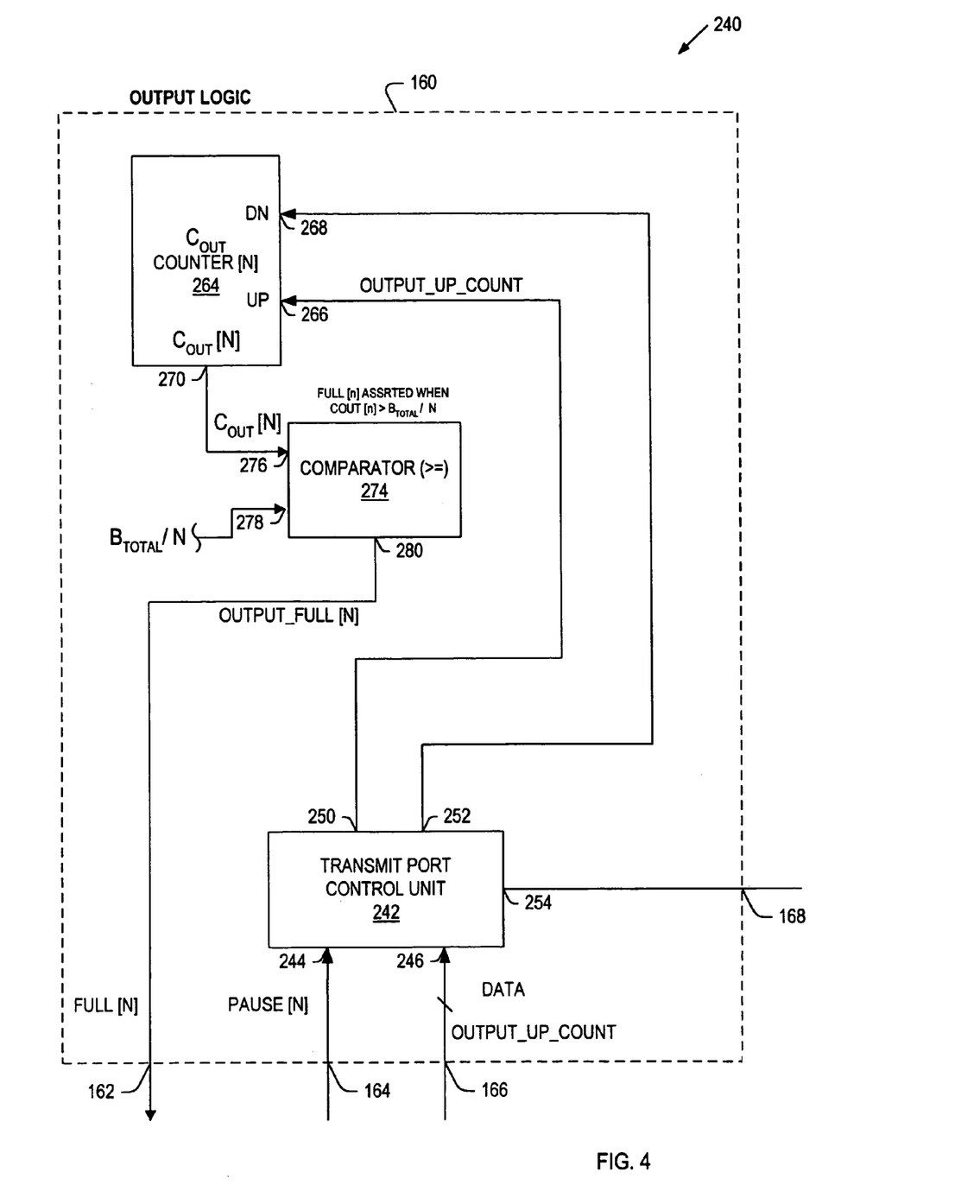
FIG. 4 is a schematic circuit block diagram illustrating details of one of the output logic units of the switching device of FIG. 1, the output logic unit for determining data flow conditions at an associated transmit port of the switch.

FIG. 4 shows a schematic circuit block diagram generally illustrating details of one of the output logic units 160 (FIG. 2) at 240. In the depicted embodiment, the output logic unit 160 includes: a transmit port control unit 242 having a port 244 for receiving the associated one of the PAUSE [N] signals via port 164 of the output logic unit, an input port 246 for receiving packet data and associated OUTPUT_UP_COUNT signal (for indicating that a packet destined for the associated transmit port has been stored in the shared memory unit) from port 152 of the packet routing/output queuing control unit 146 (FIG. 2), a port 250 for providing the OUTPUT_UP_COUNT signal, and a port 252 for providing an output down-count signal DN for indicating that a packet is being transmitted via the associated transmit port, and a port 254 for providing packet data and PAUSE messages to the associated one of the transmit buffer queues 170 (FIG. 2) via port 168 of the output logic unit; an output counter 264 having an up-count signal input port 266 for receiving the OUTPUT_UP_COUNT signal from port 250 of the control unit 242, a down-count port 268 for receiving the output queue down-count signal from port 252 of the control unit 242, and an output port 270 for providing an output count value designated $C_{OUT}[N]$ indicative of a total number of received data packets currently stored in the shared memory unit 132 (FIG. 2) that are destined for the associated transmit queue; and a comparator 274 having a first input port 276 for receiving the output count value $C_{OUT}[N]$ from port 270 of the output counter, a second input port 278 for receiving an output congestion threshold value designated $B_{TOTAL}/N$ (wherein $B_{TOTAL}$ is equal to the total amount of shared memory space provided by the memory unit 132 of FIG. 2) as further explained below, and an output port 280 for providing the associated one of the OUTPUT_FULL [N] signals to port 156 of the packet routing/output queuing control unit 146 (FIG. 2).

The comparator unit 274 is operative to assert the OUTPUT_FULL[N] signal when the output count value $C_{OUT}[N]$ is greater than or equal to the output congestion threshold value $B_{TOTAL}/N$. As mentioned above, the OUTPUT_FULL [N] signal is asserted, to indicate that the associated one of the transmit ports is "congested".

The transmit port control unit 242 is operative to assert backpressure by generating a PAUSE message to be provided to the associated transmit queue 170 (FIG. 2) when the associated PAUSE[N] signal received at its port 244 is asserted.

Figure 5:
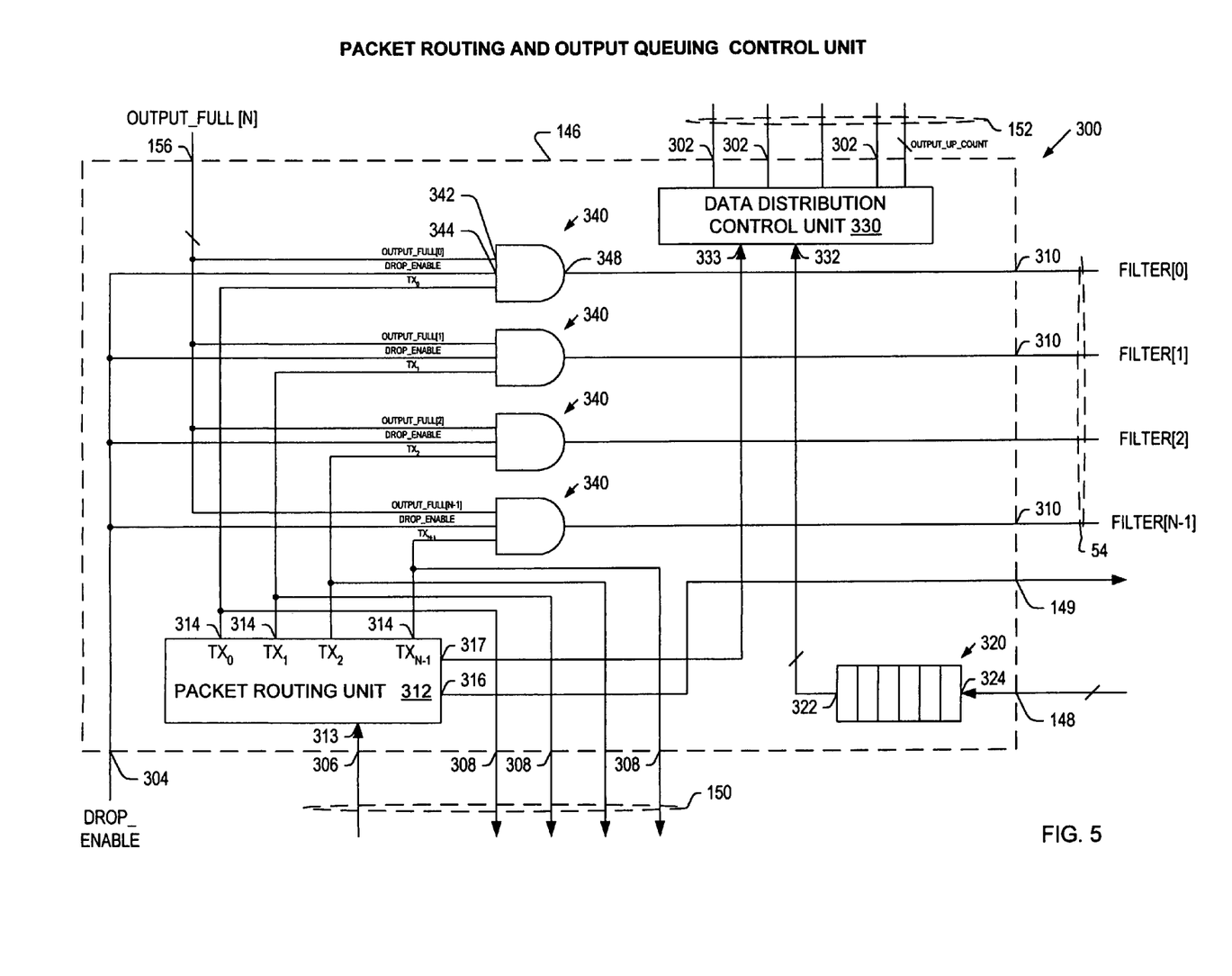
FIG. 5 is a schematic circuit block diagram generally illustrating details of the packet routing/output queuing control unit of the switching device of FIG. 2.

FIG. 5 shows a schematic circuit block diagram generally illustrating details of the packet routing/output queuing control unit 146 (FIG. 2) at 300. In the depicted embodiment, the control unit 146 includes: a control unit buffer 320 for buffering packet data read from the shared memory by the memory control unit 136 (FIG. 2), and having an input port 324 for receiving the packet data, and an output port 322; a packet routing unit 312 having a port 313 for receiving information from each of the input logic units 116 (FIG. 2), the information including requests for access to associated ones of the transmit ports 114 (FIG. 2) and destination address information that is parsed from the associated received data packets by the parsing unit 182 (FIG. 2), a plurality of N ports 314 each providing an associated one of a plurality of N transmit signals designated TX_0, TX_1, TX_2, ... TX_N-1, and a port 316 for providing information indicative of selected data packets to be read from the shared memory unit and transferred to the associated destination transmit ports; and a data distribution and control unit 330 having a plurality of N ports 302 each for providing packet data to port 166 of an associated one of the output logic units 160 (FIG. 2) via port 152 of the control unit 146, an input port 332 for receiving packet data from output port 322 of the buffer 320, and a port 333 for receiving destination port information determined by the packet routing unit 312 for each data packet to be transmitted. The data distribution control unit 330 further provides the OUTPUT_UP_COUNT[N] signals to each of the output logic units 170 (FIG. 2) to indicate when packets destined for associated ones of the transmit ports 114 (FIG. 2) are received and stored in the shared memory unit 132 (FIG. 2).

The packet routing and output queuing control unit 146 further includes a plurality of N AND gates 340. Each of the AND gates 340 includes: a first input port 342 for receiving an associated one of the OUTPUT_FULL_N signals via port 156 of the control unit 146 from an associated one of the output logic units 160 (FIG. 2); a second input port 344 for receiving a drop enable signal designated DROP_ENABLE which may be selected by a user to enable or disable dropping of packets by the switching device as further explained below; a third input port 346 for receiving an associated one of the transmit signals $TX_N$; and an output port 348 for providing an associated one of the FILTER[N] signals to port 122 of an associated one of the input logic units 116 (FIG. 2).

Operation of the shared buffer packet switching device 110 (FIG. 2) is described with reference to FIGS. 2-5. Data packets are received at each of the receive ports 112 (FIG. 2) and the parsing unit 182 (FIG. 3) associated with each receive port parses the receive data packets and provides the destination address information (e.g. a MAC destination address) to the packet routing/output queuing control unit 146 (FIG. 2). Simultaneously, the parsing unit 182 of the input logic unit provides the receive data packet to the associated one of the receive queues 130 (FIG. 2) for temporary storage. The parsing unit 182 asserts the associated UP signal upon receiving the data packet currently stored in the associated one of the receive queues 130 (FIG. 2) and the input count value determined by the input counter 200 will be increased. While the data packet is temporarily stored in the receive queue, the packet routing control unit 212 (FIG. 5) determines a destination one of the transmit ports 114 (FIG. 2) from which the data packet is to be transmitted based on its destination address. Also, based on the destination address received at port 313 of the packet routing control unit 212 (FIG. 5), the control unit 212 asserts one of the transmit signals $TX_0$, $TX_1$, $TX_2$, ... $TX_{N-1}$ provided at its ports 314 (FIG. 5). Meanwhile, if it has been determined that an indicated one of the transmit ports is congested, then the associated one of the OUTPUT_FULL[N] signals will be asserted by the associated output logic unit. As described above, one of the transmit ports 114 (FIG. 2) is determined to be congested by the associated one of the output logic units 160 (FIG. 4) if the comparator 274 (FIG. 4) determines that the output count value $C_{OUT}[N]$ is greater than or equal to the output congestion threshold value $B_{TOTAL}/N$ in which case the associated OUTPUT_FULL[N] signal is asserted to indicate that the associated transmit port is congested. With reference to FIG. 5, if the DROP_ENABLE signal is enabled by a user of the device to drop selected packets, and if the OUTPUT_FULL[N] signal associated with the transmit port to which the receive packet is destined is asserted, and if the associated one of the $TX_N$ signals is asserted, then the associated one of the AND gates 340 (FIG. 5) will assert the associated one of the FILTER[N] signals.

If the input count value $C_{IN}[N]$ is determined by the comparator 210 (FIG. 3) to be greater than or equal to the back pressure threshold value $B_{TH}$, then the comparator 210 asserts the PAUSE[N] signal. The transmit port output control unit 242 (FIG. 4) of the associated one of the output logic units s responsive to the asserted PAUSE[N] signal, and is operative to assert back pressure by generating a pause message which is provided via port 168 of the output logic unit (FIG. 2) to the associated one of the transmit queues 170 which transmits the pause message via the associated one of the network links (not shown).

If the input count value $C_{IN}[N]$ is determined by the comparator 218 (FIG. 3) to be greater than the drop threshold value $D_{TH}$, then the comparator 218 asserts the SELECT_DROP signal provided at its output 224. The drop logic unit 190 (FIG. 3) is responsive to the SELECT_DROP signal and to the FILTER[N] signals. As described above, the FILTER[N] signal is asserted when the associated one of the OUTPUT_FULL[N] signals is asserted to indicate that the associated one of the transmit ports is congested, and the DROP_ENABLE signal is asserted to indicate that packet dropping function is enabled, and the associated one of the TX[N] signals is asserted. The drop logic unit 190 (FIG. 3) is operative to assert the DROP signal provided at its output 199 if the SELECT_DROP signal is asserted and the associated FILTER[N] signal is asserted. If the drop logic unit 190 (FIG. 3) asserts the DROP signal, then the receive data packet stored in the associated one of the receive queues 130 (FIG. 2) is dropped by the associated receive queue in response to the DROP signal.

To summarize, in accordance with the present invention, a receive data packet is dropped if the transmit port to which the receive data packet is destined is determined to be congested, and the receive port at which the packet has been received is determined to be saturated, or full (that is the input count value $C_{IN}[N]$ is greater than or equal to the predefined drop threshold value $D_{TH}$). Therefore, in accordance with the flow methodology of the present invention, a received data packet is dropped at the associated receive port if the associated destination transmit port is congested, and if the associated receive port is determined to be saturated. So in accordance with the present invention, a packet is only dropped if the input port is determined to be saturated (that is, a number of data packets previously received at that receive port are stored in the shared memory unit), and the associated destination transmit port is determined to be congested. This is in contrast with prior art packet dropping schemes wherein a receive data packet is dropped based only on whether the associated receive port is determined to be saturated. Therefore, a receive port that is receiving data packets destined for different ones of the transmit ports will not drop data packets destined for transmit ports that are not congested. Therefore, uncongested transmit ports will not be starved while packets received at the same receive port and destined for congested transmit ports will be dropped. In prior art shared memory packet switching devices, packets are dropped without consideration of whether the associated one of the destination transmit ports is congested. By dropping packets without regard for whether the associated destination transmit port is congested or not, even uncongested transmit ports will be starved.

In the present invention, the function of the output logic unit 160 (FIG. 2) and the functions provided by the packet routing and output queuing control unit 146 (FIG. 2), specifically the provision of the FILTER[N] signals for filtering out or dropping receive data packets that are destined for congested transmit ports, provide for alleviating starvation of uncongested transmit ports by not dropping receive data packets destined for an uncongested transmit ports, and only dropping data packets at receive ports that are saturated if the associated destination transmit port is congested.

If a data packet received by an associated one of the input logic units 116 (FIG. 2) is not dropped, as a result of either the receive port not being full or the associated destination transmit port not being congested, then the associated receive queue 130 (FIG. 2) forwards the received data packet to the memory control unit 136 (FIG. 2) which stores the received data packet in the shared memory unit 132 (FIG. 2). Subsequently, the packet routing and control unit 212 (FIG. 5) receives a request for access to the associated destination transmit port on behalf of the receive data packet, and the packet routing control unit 212 also receives the destination address information associated with the receive data packet from the parsing unit 182 (FIG. 3), and the packet routing control unit 212 determines the associated destination transmit port. In accordance with arbitration methods, after the receive data packet is selected to be transmitted via the associated destination transmit port, the control unit 212 provides information to the memory control unit 136 (FIG. 2) indicating that the associated received data packet is to be accessed from a shared memory unit 132, and provided to the temporary FIFO 320 (FIG. 5), and then provided to the data distribution and control unit 330 (FIG. 5) which forwards the data packet to the associated one of the output logic units 160 (FIG. 2). The output logic unit 160 then provides the data packet to the associated one of the transmit queues 170 (FIG. 2) for transmission to the associated network link via the associated transmit port 114 (FIG. 2).

Figure 6:
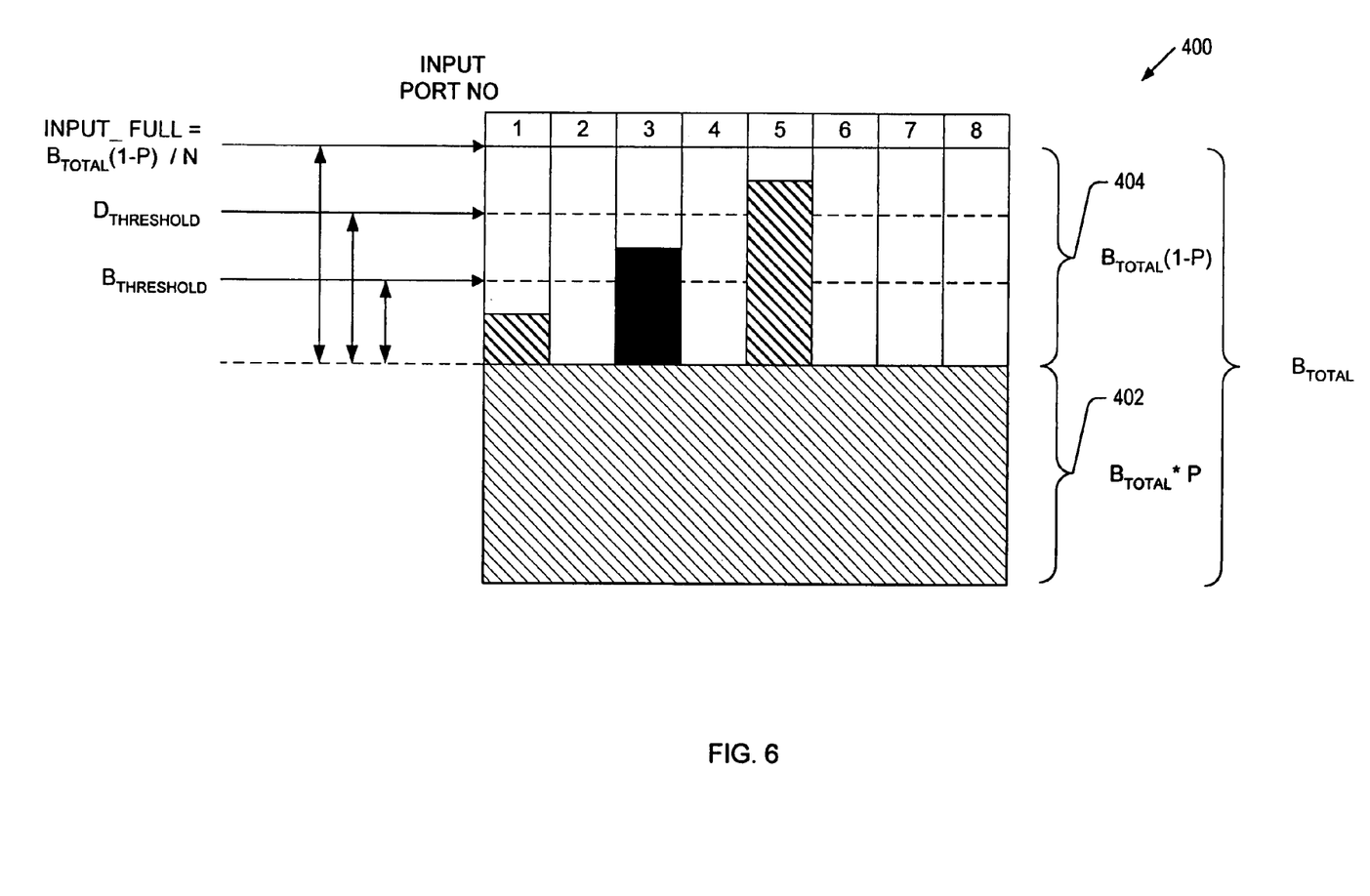
FIG. 6 is a block diagram illustrating relationships between a backpressure threshold value and a packet dropping threshold value in accordance with a first embodiment of the present invention.

FIG. 6 shows a block diagram illustrating a shared memory space at 400 of the shared memory unit 132 (FIG. 2) as managed in accordance with a first embodiment of the flow control process of the present invention. In this embodiment, the drop threshold value $D_{TH}$ is greater than the backpressure threshold value $B_{TH}$. As described above, when an occupied portion of the shared memory space exceeds the predetermined threshold portion 402 of the shared memory space (equal to P % of the total shared memory space, $B_{TOTAL}*P$, as mentioned above), the memory control unit 136 (FIG. 2) asserts the EN signal to enable the input counters 200 (FIG. 3) of each of the input logic units to begin counting packets received via the associated receive port. As shown, a reserved portion 404 of the shared memory space (equal to $B_{TOTAL}*(1-P)$) is divided into N allocated reserve portions 406 of the shared memory, one for each of the N receive ports of the switching device. When the input count value $C_{IN}[N]$ associated with a particular receive port exceeds $B_{TH}$, back pressure is asserted by sending a pause message as explained above. If one or more sending nodes (not shown) continue sending data packets to the particular receive port, the associated input count value $C_{IN}[N]$ will eventually exceed $D_{TH}$, and therefore packets received via the particular receive port will be dropped.

An INPUT_FULL value defines a maximum amount of data that may be stored in the shared memory unit 132 (FIG. 2) based on an assumption that an equal amount of memory space is allocated for each of the N receive ports (above the predetermined threshold portion P of shared memory space). The value of INPUT_FULL is defined by relationship (1), below.

$$B_{TOTAL}*(1-P)/N \quad (1)$$

wherein $B_{TOTAL}$ is the total amount of shared memory space in the shared memory unit 132 (FIG. 2), P is the occupied memory space threshold value expressed as a percent value for defining the predetermined threshold portion of memory space as described above, and N is the number of bi-directional ports of the device 110 (FIG. 2).

In the depicted embodiment of the present invention, $D_{TH}$ is set equal to a value between $B_{TH}$ and INPUT_FULL. In this embodiment, because $D_{TH}>B_{TH}$, backpressure is asserted for a receive port before any packets may be dropped. In accordance one embodiment of the present invention, the drop threshold value $D_{TH}$ is set equal to a value INPUT_FULL.

Also, in an embodiment, the relationship between INPUT_FULL and $B_{TH}$ is defined by relationship (2) below.

$$\text{INPUT\_FULL} - B_{TH} \geq N \quad (2)$$

When the values of $D_{TH}$ and $B_{TH}$ are set in accordance with relationship (2), it is ensured that the shared memory unit 132 (FIG. 2) provides at least enough memory space for storing at least one received data packet for each receive port after backpressure is asserted for the associated receive port.

Figure 7:
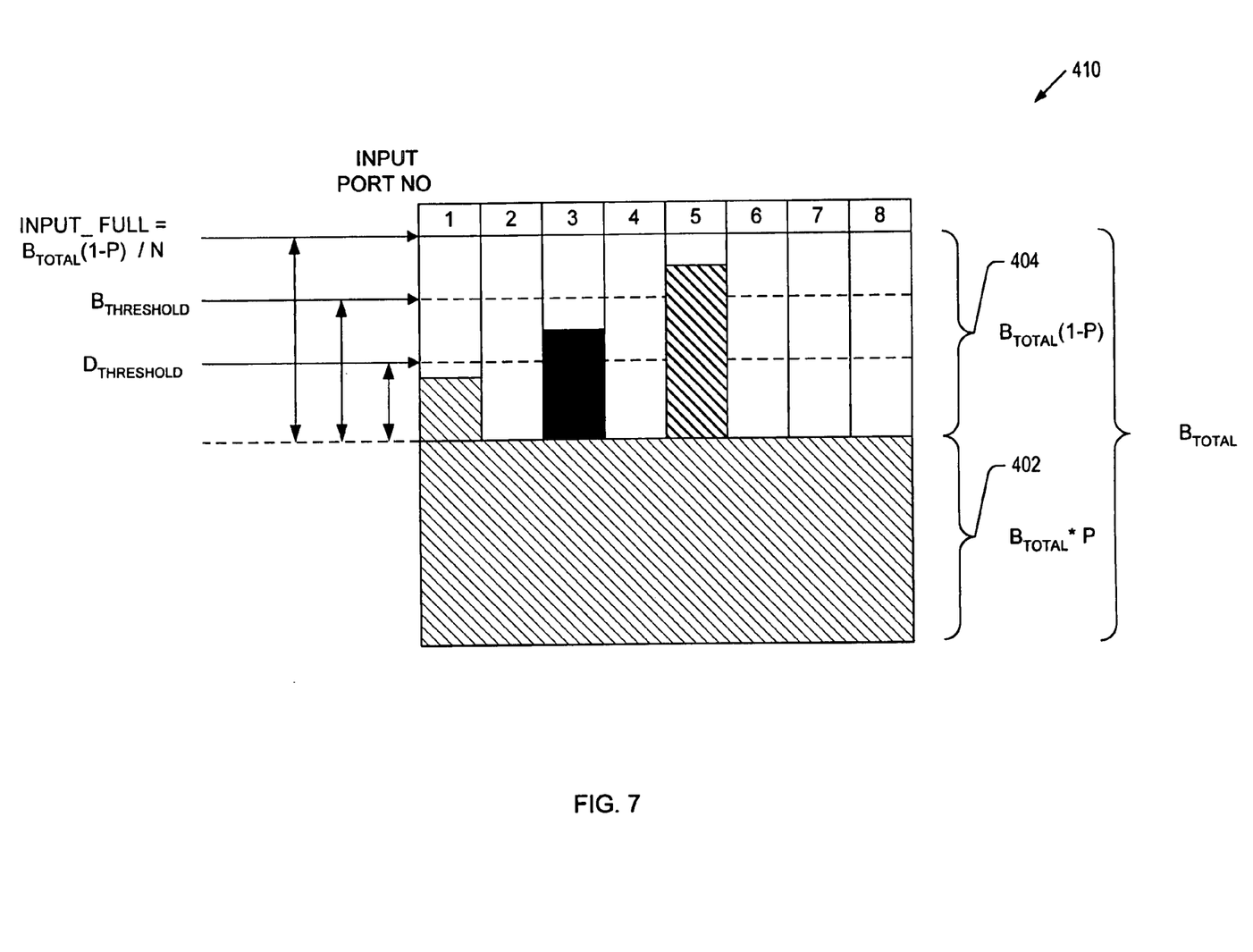
FIG. 7 is a block diagram illustrating relationships between a backpressure threshold value and a packet dropping threshold value in accordance with a second embodiment of the present invention.

FIG. 7 shows a block diagram illustrating a shared memory space at 410 of the shared memory unit 132 (FIG. 2) as managed in accordance with a second embodiment of the flow control process of the present invention. In this embodiment, the drop threshold value $D_{TH}$ is less than the backpressure threshold value $B_{TH}$. When the input count value $C_{IN}[N]$ associated with a particular receive port exceeds $D_{TH}$, packets are dropped at the particular receive port. If the associated input count value $C_{IN}[N]$ continues to increase and exceeds $B_{TH}$, back pressure is asserted at the particular receive port by sending a pause message as explained above.

In the depicted embodiment, the relationship between $D_{TH}$ and $B_{TH}$ is defined by relationship (3) below.

$$B_{TH} - D_{TH} \geq N \quad (3)$$

In this embodiment of the present invention defined by relationship (3), packets received at saturated receive ports are dropped before backpressure is applied. "Because the pause message is port based, when the switch sends a pause message, all external sources must be stopped. Some applications are sensitive to time delay. Therefore a flow control pause message could cause quality problems for some traffic streams. By selecting $D_{TH}$ to be less than $B_{TH}$, packets going to congested transmit ports earlier . . . ".

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A flow control method in a network device, comprising:
   receiving a data packet at a receive port in the network device;

incrementing a receive port counter only when a count of previously received data packets stored in a shared memory exceeds a predetermined value;

determining, using a comparator, whether the receive port counter is greater than a first threshold;

determining a transmit port for transmitting the received data packet to its destination;

incrementing a transmit port counter for the transmit port;

determining whether the transmit port counter is greater than a second threshold, which, when the transmit port counter is greater than the second threshold, defines the transmit port as congested;

dropping the data packet if the receive port counter is greater than the first threshold and the transmit port counter is greater than the second threshold such that only selected packets received at the receive port, which are destined for a congested transmit port, are dropped; and processing the data packet if the receive port counter is greater than the first threshold and the transmit port counter is less than the second threshold such that data packets received at the receive port, which are destined for an uncongested transmit port, are not dropped.

2. The flow control method of claim 1, further comprising:
determining whether a user programmable drop enable signal has been asserted; and
dropping the data packet only when the user programmable drop enable signal has been asserted.

3. The flow control method of claim 1 wherein determining whether the transmit port counter is greater than a second threshold comprises determining, using a comparator, whether the transmit port counter is greater than the second threshold.

4. The flow control method of claim 1 wherein the first threshold is proportional to a value determined by dividing the shared memory into N parts.

5. The flow control method of claim 1 wherein the first threshold is substantially equal to a number of data packets capable of being stored in a maximum portion of the shared memory.

6. A network device, comprising:
a shared memory configured to store received data packets;
a plurality of receive ports configured to receive data packets and to store the received data packets in the shared memory;
a plurality of transmit ports configured to transmit data packets that are stored in the shared memory to their respective destinations; and
receive port flow control logic, implemented in at least one of the receive ports, comprising:
a receive port counter configured to be incremented only when a predetermined portion of the shared memory is used to store previously received data packets;
circuitry to determine whether the receive port counter is greater than a backpressure threshold; and
circuitry to send a pause control signal to at least one of the transmit ports when the receive port counter is greater than the backpressure threshold; and
transmit port flow control logic, implemented in at least one of the plurality of transmit ports, comprising: a transmit port counter configured to be incremented and circuitry to determine whether the transmit port counter is greater than a first threshold, which, when the transmit port counter is greater than the first threshold, defines the transmit port as congested; and
circuitry within the receive port flow control logic to determine whether the receive port counter is greater than a drop threshold and to send a packet drop signal if the receive port counter is greater than the drop threshold and the transmit port counter is greater than the first threshold such that only selected packets received at the receive port, which are destined for a congested transmit port, are dropped, wherein the backpressure threshold and the drop threshold are configurable relative to each other to determine whether data packets are dropped before or after the pause control signal is sent.

7. The network device of claim 6, wherein the circuitry within the receive port flow control logic to determine whether the receiver port counter is greater than the backpressure threshold comprises a first comparator.

8. The network device of claim 6, wherein the circuitry within the receive port flow control logic to determine whether the receive port counter is greater than the drop threshold comprises a second comparator.

9. The network device of claim 6, wherein the circuitry within the transmit port flow control logic to determine whether the transmit port counter is greater than the first threshold comprises a third comparator.

10. The network device of claim 6 wherein the backpressure threshold is proportional to a value determined by dividing the shared memory into N parts.

11. The network device of claim 6 wherein the backpressure threshold is substantially equal to a number of data packets capable of being stored in a maximum portion of the shared memory.

12. A network device, comprising:
a plurality of receive ports, configured to receive data packets;
a shared memory, configured to store the received data packets;
a plurality of transmit ports, configured to transmit received data packets stored in the shared memory to their respective destinations;
transmit port flow control logic, implemented in at least one of the plurality of transmit ports, comprising: a transmit port counter configured to be incremented, and circuitry, including a first comparator, to determine whether the transmit port counter is greater than a first threshold; and
receive port flow control logic, implemented in at least one of the receive ports, comprising:
a receive port counter configured to be incremented when a predetermined portion of the shared memory is used to store previously received data packets;
circuitry to determine whether the receive port counter is greater than a second threshold; and
circuitry to:
send a packet drop signal if the transmit port counter is greater than the first threshold, which, when the transmit port counter is greater than the first threshold, defines a transmit port as congested, and the receive port counter is greater than the second threshold such that only selected packets received at the receive port, which are destined for a congested transmit port, are dropped, and process received data packets if the transmit port counter is less than the first threshold and the receive port counter is greater than the second threshold such that data packets received at the receive port, which are destined for an uncongested transmit port, are not dropped.

13. The network device of claim 12, wherein the circuitry within the receive port flow control logic to determine whether the receive port counter is greater than the second threshold comprises a second comparator.

14. The network device of claim 12 wherein the second threshold is proportional to a value determined by dividing the shared memory into N parts.

15. The network device of claim 12 wherein the second threshold is substantially equal to a number of data packets capable of being stored in a maximum portion of the shared memory.

* * * * *